United States Patent
Jain et al.

(10) Patent No.: US 10,843,500 B2
(45) Date of Patent: Nov. 24, 2020

(54) WATERMARK SHEET, APPARATUS, AND DOCUMENT, AND METHODS FOR PROVIDING THE SAME

(71) Applicant: Crane & Co., Inc., Boston, MA (US)

(72) Inventors: Manish Jain, Pittsfield, MA (US); Giles D. Prett, Dalton, MA (US)

(73) Assignee: Crane & Co., Inc., Boston, MA (US)

( * ) Notice: Subject to any disclaimer, the term of this patent is extended or adjusted under 35 U.S.C. 154(b) by 0 days.

(21) Appl. No.: 16/127,198

(22) Filed: Sep. 10, 2018

(65) Prior Publication Data

US 2019/0077183 A1 Mar. 14, 2019

Related U.S. Application Data

(60) Provisional application No. 62/556,734, filed on Sep. 11, 2017.

(51) Int. Cl.
*D21F 1/44* (2006.01)
*D21F 1/46* (2006.01)
(Continued)

(52) U.S. Cl.
CPC ........... *B42D 25/333* (2014.10); *B42D 25/29* (2014.10); *D21F 1/44* (2013.01); *B32B 3/266* (2013.01);
(Continued)

(58) Field of Classification Search
CPC . D21F 1/44; D21F 1/46; D21F 1/0027; D21F 1/0036; D21F 1/009; D21F 1/10;
(Continued)

(56) References Cited

U.S. PATENT DOCUMENTS 7,849,704 B2   12/2010   Ashibe et al.

FOREIGN PATENT DOCUMENTS

EP   2826915 A1   1/2015
EP   2899312 A1   7/2015
(Continued)

OTHER PUBLICATIONS

Notification of Transmittal of the International Search Report and the Written Opinion of the International Searching Authority, or the Declaration dated Dec. 11, 2018 in connection with International Patent Application No. PCT/US2018/050311, 13 pages.
(Continued)

*Primary Examiner* — Eric Hug

(57) ABSTRACT

A watermark sheet made up of a substrate layer with opposing water and fiber surfaces, a pattern of at least two watermark indicia, and a set of apertures extending from the water surface toward the fiber surface of the substrate layer, is provided. The pattern of at least two watermark indicia is distributed over a continuous area of the fiber surface. The inventive watermark sheet provides watermarks of improved quality. Also provided is a watermark sleeve made up of a cylinder mold and the inventive watermark sheet wrapped around and affixed to an outer diametric surface of the cylinder mold. In addition, methods of manufacturing the watermark sheet, the watermark sleeve, a watermarked paper and a high security document are provided, as well as products resulting from these methods of manufacture.

16 Claims, 3 Drawing Sheets

(51) Int. Cl.
    *B42D 25/333*     (2014.01)
    *B42D 25/29*     (2014.01)
    *B32B 3/26*     (2006.01)
    *B32B 15/08*     (2006.01)
    *B42D 15/00*     (2006.01)

(52) U.S. Cl.
    CPC ........... *B32B 15/08* (2013.01); *B32B 2554/00* (2013.01); *B42D 15/0093* (2013.01); *D21F 1/46* (2013.01)

(58) Field of Classification Search
    CPC ....... D21F 1/105; D21F 11/006; D21H 27/02; B41M 3/10; B42D 25/29; B42D 25/333; B42D 25/43; B42D 25/44
    USPC .................................................. 162/110, 352
    See application file for complete search history.

(56) References Cited

FOREIGN PATENT DOCUMENTS

| | | | | |
|---|---|---|---|---|
| EP | 2899316 A1 | | 7/2015 | |
| GB | 2532081 A | * | 5/2016 | ............... D21F 1/44 |
| WO | 02/088464 A1 | | 11/2002 | |
| WO | 2006/075443 A1 | | 7/2006 | |
| WO | 2013/140126 A1 | | 9/2013 | |

OTHER PUBLICATIONS

International Preliminary Report on Patentability in connection with International Application No. PCT/US2018/050311 dated Mar. 26, 2020, 8 pages.

* cited by examiner

WATERMARK SHEET, APPARATUS, AND DOCUMENT, AND METHODS FOR PROVIDING THE SAME

RELATED APPLICATION

This application claims priority to U.S. Provisional Patent Application Ser. No. 62/556,734, filed Sep. 11, 2017, which is incorporated herein in its entirety by reference.

TECHNICAL FIELD

The present invention relates to an article of manufacture suitable for use in forming a watermark. This article of manufacture, referred to herein as a watermark sheet, is also used to form an apparatus (i.e., watermark sleeve) which is used in the manufacture of a watermark paper which is in turn used to manufacture a watermarked document. Additionally, the present invention also relates to methods of providing the watermarking sheet, providing the apparatus and providing the watermark paper and document.

BACKGROUND

High security documents, such as banknotes, checks, passports and the like, rely on various authentication tools to help mitigate the proliferation of counterfeits. One particular authentication tool, among the various tools available to manufacturers/users of high security documents, is a watermark. Watermarks function as anti-counterfeiting, tools partly because of the obstacle they present to would-be counterfeiters who often rely on contemporary and advanced printing and photocopying techniques to duplicate/copy authentic banknotes.

Users of banknotes rely on the presence of certain watermark indicia, which could be a depiction of persons, numbers, letters, symbols and/or landscapes in order to authenticate high security documents. Such watermark indicia are generally incorporated into a high security document during the manufacturing process of the paper used to form the high security document. To be effective as an authentication tool the watermark indicia is imbued with certain motility effects whereby subtle or more obvious changes in an observer's viewpoint results in an observable change in the appearance of the indicia. For example, viewing the watermark indicia in reflected light, an observer will see that the indicia has a first appearance while viewing the watermark indicia in transmitted light (i.e., light transmitting through a paper when the paper is held between an observer and a light source) provides a second appearance. Counterfeiters who rely on contemporary and advanced printing and photocopying techniques for counterfeiting authentic high security documents struggle to provide these motility effects. This struggle is particularly pronounced when the authentic high security documents have very clear watermark indicia. Clear watermark indicia is typically understood as having at least one of high-resolution, high-definition or high-contrast; preferably a combination of these features. Accordingly, it is of great importance that the watermark indicia incorporated into a high security document are presented in the high security document in a way that is as clear as possible so that a user can easily distinguish a watermark feature that is applied during paper manufacturing from one that is applied post-manufacturing such as by photocopying. The recognition of such distinctions thereby enables an end-user to easily distinguish a counterfeit from an authentic high security document.

While there are various kinds of watermarks known to a person having ordinary skill in the art (hereinafter "PHOSITA"), it is generally understood that one of the most suitable is a multi-tonal watermark that relies on density distortions of the paper's fibers to produce high resolution features. For example, watermarks are usually applied to a high security document by a cylinder mold process. Here the cylinder mold is covered by a wire mesh into which a set or pattern of negative watermark indicia (NWI) is formed. Each of these negative watermark indicia generally includes raised places, sunken places and plane places. During the paper's manufacturing process, the wire mesh with the NWI is brought into contact with a slurry of paper fibers and thereby forms positive watermark indicia (PWI) in the corresponding watermark areas of the resulting paper. Here, in these corresponding watermark areas, areas that are in contact with the sunken places will have high fiber density (HFD); areas in contact with the raised, places will have low fiber density (LFD); and areas in contact with the plane places will have a gradient of fiber densities (GFD) between those formed by the sunken places and those formed by the raised places. The high fiber density areas form dark areas in the PWI while the areas of low fiber density form light areas in the PWI. Various tones between dark and light are formed from the plane places. The clarity of the watermark often depends on the contrast between dark and light areas and often depends on the proximity between the dark and light areas.

While the above process can provide watermarks of reasonable quality, it has certain shortcomings. For example, the process of forming the PWI involves a double-image-transfer process. Here a watermark image is first formed in a die, and then in an embossing step the die is used to transfer the watermark image to the wire mesh thereby forming the NWI; in a subsequent watermarking step, the NWI is then used to redistribute the fibers in the slurry to form the PWI in the paper. Because of the holes in the wire mesh during the embossing step certain image information present in the die will not be transferred to the wire mesh and therefore will not be transferred to the paper. This reduces the watermark's clarity. Additionally, because high variations in fiber density produces higher resolution watermarks it is often required that the wire mesh is highly deformed in the watermark area such that the raised places and sunken places are quite often next to each other creating a significant contrast. To create such significant contrasts, the wire mesh will be significantly deformed and stressed which can result in reduced strength, increased stress, reduced life cycle, decreased repeatability, increased expense and damage to the mold cover. This also limits the use of any complex watermark features. Moreover, the wire mesh quite often imparts a wire-meshed marking over the entire paper, not just in the watermark areas which quite often deteriorates the resolution of the watermark feature. This wire-meshed marking is uncontrolled and thereby becomes a random pattern which reduces the ability of an end-user to determine the document's authenticity.

It is also very difficult to use the wire mesh to produce very light areas in the watermark areas without damaging the paper or creating unwanted holes in the paper. One solution is to use an electrotype process. Here a thin piece of metal is attached to the wire mesh by sewing it or welding it on to create raised areas usually in the form of a letter, number or symbol. The electrotype metal prevents the liquid in the slurry from getting out through the raised places thereby reducing the fiber density in these areas. The electrotyping process will be apparent to a PHOSITA and is further clarified by the National Bank of Hungary in U.S. Pat. No. 1,901,049. However, even this approach to producing light areas has its drawbacks and shortcomings. For example, it is very difficult to affix an electrotype to a wire mesh in general and it is even more difficult to attach the electrotype to a sunken place, in particular, if one had the desire to create a very light area within a dark area. It is also quite time consuming to add an electrotype to a wire mesh. Moreover, it is very difficult to generate complex indicia, such as Arabic words, using electrotypes.

It is also quite often found that in order to produce high resolution watermarks, the drainage rate of the slurry liquid must be controlled. With a wire mesh this is often done by increasing the drainage rate in the sunken place by applying a vacuum to the sunken places so that the liquid's drainage rate can be locally increased relative to the surrounding areas of the wire mesh. Alternatively, to decrease the drainage rate, a rate decreasing element (e.g., impermeable metal plate, plastic element, etc.) is placed beneath the wire mesh. However, neither of these works well as the vacuum quite often affects both the raised and sunken places simultaneously and the rate decreasing element does not prevent lateral draining.

An alternative to a wire mesh is to apply an insert element into the wire mesh. Here the insert is perforated and is often injection molded to provide the negative image for the watermark. This also has substantial drawbacks as well. For example, it is difficult to attach the insert element and it is often found that the insert element loosens or separates from the wire mesh during the paper manufacturing process. U.S. Pat. No. 8,349,132 describes an insert that requires the molding of a knob-shaped indentation onto the insert in order to affix the insert to the wire mesh. However, these knob-shaped indentations often fail to maintain the connection between the wire mesh and the insert. Moreover, such knob-shaped indentations are difficult to form accurately and even more difficult to attach to a wire mesh with other embossings. Such inserts are used in forming a single watermark feature and still require a wire mesh that will often leave an unwanted pattern on the paper. A similar insert is described in U.S. Pat. No. 8,840,756 where the perforations in the insert are formed by an injection mold that simultaneously forms the relief of the watermark feature and the perforations. As such, it is argued that the perforations are directly correlated to the depth of the relief structures. Such an insert again suffers from the deficiencies of the previously described insert in that it is difficult to attach the insert to the wire mesh, difficult to maintain the connection and does not allow the application of the insert to an embossed area of the wire mesh. More importantly, only a single watermark feature is formed in each insert.

As is evident from the above, it can be seen that authentication of high security documents remains a challenging yet important task. There remains a need for improved means of authenticating such documents and in particular there remains a need for improved watermarking techniques and articles of manufacture to deploy such techniques. The present inventors have developed methods and articles of manufacture that are surprisingly effective in providing watermarks of improved quality.

The invention is as set forth in the claims presented herein. However, for purposes of clarity, such that a PHOSITA may be able to make and use the claimed invention without undue experimentation, the following descriptions and drawings are provided as exemplary embodiments of the claimed invention. It should be understood that elements or components of each embodiment presented herein may be applied to another embodiment presented herein and thereby form a further embodiment.

SUMMARY

In view of the above-identified deficiencies, it is en object of the present invention to provide (i) an article of manufacture, (ii) an apparatus, (iii) methods of forming and using the article of manufacture and apparatus and (iv) for using said methods, articles of manufacture and apparatus to produce watermarks in papers and documents, without at least some of the above-identified deficiencies. The inventors have surprisingly found the present invention meets this objective.

The invention is presented herein from several points of view. In a first aspect the invention is an article of manufacture in the form of a watermark sheet. In a second aspect the invention is an apparatus in the form of a watermark sleeve. In a third aspect, the invention is a method of manufacturing the watermark sheet. In a fourth aspect, the invention is a method of manufacturing the watermark sleeve. In a fifth aspect, the invention is a method of manufacturing watermark paper. In a sixth aspect the invention is a method of manufacturing high security documents and in a seventh aspect the invention is a high security document.

In further aspects, the invention is a product by process in the form of any of articles of manufacture or apparatus being specifically manufactured according to the respective process highlighted above and further clarified herein. It is also contemplated herein that in certain aspects, the invention is a use of the articles of manufacture or apparatus highlighted above and further clarified herein for the purpose of applying watermarks or in the process of manufacturing high security papers or high security documents or for use in authenticating high security documents.

In one embodiment, the watermark sheet comprises (a) a substrate layer including (i) a water surface and (ii) a fiber surface disposed opposite the water surface; (b) a pattern of at least two watermark indicia; and (c) a set of apertures extending from the water surface toward the fiber surface; wherein the pattern of at least two watermark indicia is distributed over a continuous area of the fiber surface.

In one embodiment, the watermark sleeve comprises (a) a cylinder mold having an outer diametric surface; and (b) the watermark sheet as described herein, such as in claim 1; wherein the watermark sheet is wrapped around or about, and affixed to, the outer diametric surface of the cylinder mold either directly or indirectly. In a more general embodiment, it must be understood that the watermark sheet is affixed to the cylinder mold in a way such that as a slurry of paper fibers passes over the watermark sleeve an impression of the watermark indicia found on the watermark sheet (NWI) is transferred into the paper (PWI).

In one embodiment, the method of forming the watermark sheet comprises (a) providing a substrate layer with a water surface and a fiber surface disposed opposite the water surface; (b) perforating the substrate layer to form apertures; and (c) forming watermark areas on the fiber surface by ablating areas of the fiber surface to form a pattern of multiple watermark indicia over a continuous area of the fiber surface.

In one embodiment, the method of forming the watermark sleeve comprises, (a) forming a watermark sheet as described herein, or more particularly as described in claim 15; (b) providing a cylinder mold; and (c) affixing the watermark sheet over the outside diametric surface of the cylinder mold. In a more general embodiment, it must be understood that the watermark sheet is affixed to the cylinder mold in a way such that as a slurry of paper fibers passes over the watermark sleeve, an impression of watermark indicia found on the watermark sheet is transferred into/onto the paper.

In one embodiment, the watermark paper comprises, (a) a paper substrate having watermark areas and background areas; (b) a watermark indicia integrated with the paper substrate in the watermark areas; and (c) a background indicia or background pattern integrated over a background area. In more particular embodiments, the watermark areas are interposed with the background indicia or background pattern. In preferred embodiments, the background indicia or pattern is imperceptible with the naked human eye but is observable with an optical device.

In one embodiment, the high security document comprises (a) a watermark paper as described herein or more particularly as described in claim 22; and (b) a surface applied print.

In one embodiment, the method of manufacturing watermark paper comprises (a) providing a watermark sleeve, as described herein, (b) transporting a slurry of paper fibers across the watermark sleeve such that an impression of the watermark indicia found on the watermark sleeve is transferred onto/into the paper.

In one embodiment, the method of manufacturing a high security document comprises (a) providing a watermark paper, as described herein; and (b) applying a further surface treatment (e.g., print) to the paper to form the high security document.

The aspects and embodiments generally summarized above will be further developed in the subsequent paragraphs and drawings.

Definitions

As used herein, the term "cylinder mold" shall be understood as including any component of the paper machine onto which the watermark sheet may be applied in order to form the watermark indicia and/or background indicia or pattern into paper.

As used herein, the term "light element" includes electrotype materials such as metals, but also includes the use of integrated materials or add-on materials that can be ablated to form the light element or electrotype area.

As used herein, the term "electrotype" includes any light element suitable for of holes or very low fiber density areas in the paper.

As used herein, the term "substrate layer" excludes a conventional wire mesh and includes any single or multi-layered structure that is malleable and can be either ablated or deformed to form a watermark feature.

As used herein, the term "watermark area" shall be understood as distinct areas across the substrate layer having a single relief structure pattern bounded therein and bordered by the lateral perimeter of the watermark feature.

As used herein, the term "watermark feature" shall be understood as a distinct pattern, design, image, text, number, or any indicia having a relief structure within a watermark area.

DRAWINGS

WRITTEN DESCRIPTION

Figure 1:
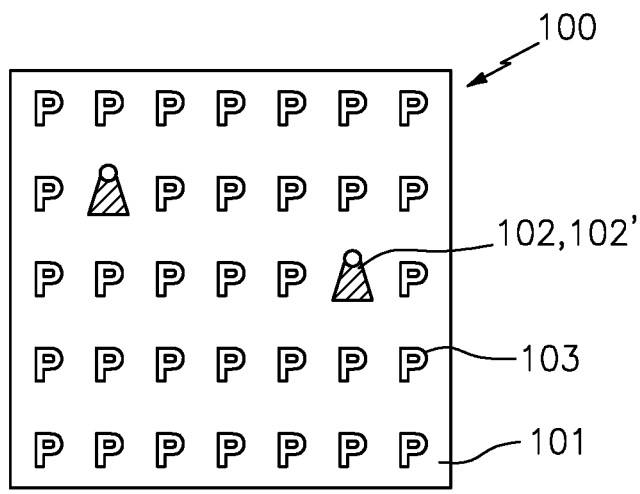
FIG. 1 shows a top-down view of a watermark sheet with watermark indicia surrounded by background pattern in the form of shaped apertures.

The inventors have surprisingly found that certain objectives of the invention are satisfied by the present invention. Particularly, it has been found that by avoiding the use of conventional wire mesh mold covers, and instead using a more malleable sleeve material—such as polymeric, plastic, rubbery or rubber-like material—to form the watermark sheet, the durability of the watermark sleeve is improved. It was also surprisingly found that high resolution watermarks with very dark and very light areas are possible. Moreover, there is no need for attaching separate light elements (e.g., electrotypes) as the light elements can be formed using the same continuous material which reduces the likelihood of detachment and reduces the difficulty of attachment. Importantly, it has also been discovered that it is possible to apply watermarking over the entire surface area of the paper/document by a combination of watermark areas and background areas of the watermark sleeve/sheet. By integrating background patterns into the paper, such background indicia or patterns can be used as level-1 or level-2 security or identifying features. These background patterns can be combined with the watermark indicia by interposing or overlapping both to form new indicia, or to highlight one or the other. Furthermore, it was surprisingly discovered that it was easier to control the drainage rates and that such control can be varied over the full surface area of the watermark sleeve which means that the patterns available for integration into the paper can be applied over the full surface areas of the paper. Quite surprisingly, it was also discovered that it was possible to vary distribution of apertures in the sheet, sleeve, or mold cover to form background indicia and also to locally impact the drainage rates in watermark areas where the watermark indicia are located. Advantageously, it is, also found that through the use of the present invention, papers and high security documents can be imbued with high frequency lines that improve durability of the paper and documents, especially in the edge and corner areas. Additional benefits will be apparent to a PHOSITA when considered in view of the present invention and description.

In one aspect, the invention is a watermark sheet. In one embodiment, the watermark sheet comprises, among other elements, a substrate layer. The inventors have found that the substrate layer materials that are most suitable are those that do not have an exposed wire mesh or more particularly, those that are flexible enough to be wrapped around a cylinder mold, and durable enough to withstand the rigors of a papermaking process without further deforming the watermark indicia in a significant way, while being readily ablated to form the watermark indicia directly into the sheet without the need for a double-image transfer process. In this regard, the inventors have found various materials suitable and in view of the present disclosure a PHOSITA will be able to readily identify certain other suitable materials.

It should be noted and understood that the substrate layer may, have a single layer or a multi-layer construction. In certain embodiments, the single layer is constructed of multiple materials such that in a certain first section the layer has one malleable material and in another section it has a different malleable or less malleable material. In embodiments where the substrate layer has a multi-layer construction the single layer constructions described herein may be coupled as any of the multiple layers.

In one particular embodiment, the substrate layer(s), or at least a portion thereof, is constructed from at least one of the following malleable materials: polymeric, plastic, elastic, rubber, rubbery, elastomeric, thermoplastic, thermoset plastic or a non-malleable material coated with at least one of these malleable materials.

The substrate layer has a fiber surface and a water surface opposite the fiber surface. In a paper manufacturing process the fiber surface impacts and/or contacts the paper fibers while the water surface is distal from the fiber surface and is present on the side of the substrate layer where the liquid in the slurry of fibers is drained away.

While not the preferred embodiment, it is also contemplated that in certain embodiments a wire mesh is integrated between layers of the multi-layer construction of the substrate layer. In a single layer construction, it is also preferred that no wire mesh is employed, however in one embodiment, the single layer construction includes portions constructed of a wire mesh if surrounded by malleable materials or is only in the edge regions. This is particularly, though not exclusively, preferred in the edge regions of the substrate layer as it has been found advantageous, though not required, to employ a wire mesh for interlocking the substrate layer to the cylinder mold.

In one embodiment, the substrate layer comprises a woven material constructed of coated filaments organized to form the substrate layer. In a preferred embodiment, the coating comprises a malleable material as described herein. It is also contemplated that the substrate layer may be alternatively constructed as a non-woven material. In one such particular embodiment, the filaments are aligned in a non-woven matrix and are then coated with a malleable material.

It is also contemplated that the substrate layer is formed as a multi-layer system with a pliable metallic (e.g., aluminum, etc.) material disposed between multiple layers of malleable materials.

The substrate layer of the mold sleeve must be malleable such that it can be contorted to fit a cylinder mold. The cylinder mold, as used herein refers to, for example a cylinder roll or dandy roll or any component of a paper machine that can be used, in conjunction with an affixed watermark sheet, to integrate a watermark into paper during the manufacturing process of the paper. Where the cylinder mold is a cylinder roll, the substrate layer of the watermark sheet is constructed of a material that can be contorted to fit the diametric or circumferential surface of the cylinder roll. As any paper machine is contemplated for use with the present invention, a dandy roll on a Fourdrinier paper machine is also a suitable cylinder mold. Other cylinder molds include the forming wire of a Fourdrinier machine, a short former or a top former. Alternatively, the cylinder mold may be a cylinder roll typically found in a vat process. The rotating device may also be found on other paper machines such as twin-wire formers or multi-ply formers.

The substrate layer has continuous areas over which multiple watermark indicia are distributed. This excludes wire mesh having an insert since such inserts are discontinuous. The inventors have found that a substrate layer that has a continuous portion that covers a significant portion of the cylinder mold allows for imparting particular patterns to the full paper surface. Moreover, the entire surface of the sleeve can be patterned with watermark indicia and/or background indicia without deteriorating the life-cycle of the watermark sleeve. Accordingly, in a preferred embodiment, the watermark sheet covers greater than 10% of the cylinder mold. In a preferred embodiment, the watermark sheet covers between 20% and 100% of the cylinder mold; more preferably between about 80% and about 100%. More preferably, the watermark sheet has width dimension greater than 50 millimeters (mm); preferably ranging from 50 mm to 5 meters (m); more preferably from about 70 mm to about 100 mm. In a preferred embodiment, the watermark areas on the watermark sheet or sleeve are distributed over a continuous area of the watermark sheet/sleeve; particularly, this continuous area is uninterrupted by a wire mesh. As used herein, the term continuous area generally refers to an area of the substrate layer with multiple watermark indicia or a pattern of multiple watermark indicia where the material in the watermark areas are the same as the material in the background areas. As such, traditional inserts attached to a wire mesh are beyond the scope of the present invention. Here the continuous area is only interrupted by the relief structure of any watermark indicia in the watermark areas. Preferably the continuous area has a width covering a significant portion of the cylinder mold; for example all of the cylinder mold's exposed surface area; more preferably greater than 80% of the width of the cylinder mold; or alternatively it has a width ranging from 60 mm to about 150 mm.

The substrate layer, as described herein, can have a single-layer or a multi-layer construction, but in any case, will have a water surface and a fiber surface disposed on opposing sides of the substrate layer. The water surface drains away water from the slurry of fibers while the fiber surface will impact the paper fibers and integrate the watermark into the paper. The fiber surface includes a continuous area with a pattern of multiple watermark indicia; at least two. In one embodiment, the water surface is connected to the fiber surface by a set of apertures, in some areas, extending through the full thickness of the substrate layer; from the water surface to the fiber surface.

In one embodiment, the watermark sheet comprises a pattern of at least two watermark indicia, among other elements. The pattern is an array of watermark indicia distributed over a continuous area of the fiber surface. Each watermark indicia includes a relief structure depicting a negative watermark indicia (NWI) or positive watermark indicia (PWI). The relief structure having sunken places, raised places and plane places. The sunken places are used to form dark areas in the watermark areas of the paper by increasing the fiber density in the paper. By contrast, the raised places are used to form light areas in the paper's watermark areas by decreasing the fiber density in the paper. The plane places are used to form gradients of dark to light, including fiber density equivalent to the paper's background areas (i.e., NFD).

In one embodiment, the watermark indicia is selected from letters, portraits, landscapes, text, numbers, or symbols. The indicia is depicted through the cooperation of light and dark areas formed in the paper. As the slurry of paper fibers is brought into contact with the watermark sleeve, the watermark indicia on the watermark sheet causes dislocation of the fibers such that a high fiber density (HFD) is formed where the slurry contacts the sunken places and a low fiber density (LFD) is formed in the paper where the slurry contacts the raised places of the watermark indicia's relief structure. The watermark areas on the substrate layer are surrounded by background areas that have a nominal fiber density (NFD).

In one embodiment, the watermark indicia is surrounded by background indicia or a background pattern. Preferably, the background pattern or indicia is in close proximity or is interposed with the watermark indicia. It has surprisingly been found that by integrating the watermark indicia and background indicia/pattern, an improved watermark contrast is provided in the resulting paper.

In one embodiment, the watermark indicia surrounds background indicia/pattern.

It is also contemplated that in some embodiments the background pattern is imperceptible with the naked human eyes. Moreover, in one embodiment, the apertures forming the background indicia or pattern may have any shape including oval, circular, triangular, or square. It is also contemplated within the scope of the present invention that the individual apertures themselves, are shaped in the form of text, numbers or symbols thereby forming shaped apertures. Moreover in a further embodiment it is also contemplated that the shaped apertures are organized such as to form indicia identical or distinct from the shaped apertures. For example, in one embodiment, the shaped apertures are the letter P while the background indicia comprises a pattern of Ps organized to form the letter X. In one embodiment, the background indicia or pattern is perceptible by the naked human eye while the shaped apertures require the aid of a visual or tactile aide.

The background indicia/pattern is formed by the apertures extending from the water surface towards the fiber surface and preferably extending through the full thickness of the substrate layer. Advantageously, it has been found that by varying the distribution of the apertures in the substrate layer, or varying the size of the apertures over the substrate layer, various background patterns can be generated in the paper. For example, it is possible to form background indicia by varying the aperture size or distribution. In one embodiment, the apertures are varied over the water surface and fiber surface to form letters, micro-letters, symbols, micro-symbols, text, micro-text, portraits or micro-portraits of constant or variable tonality.

In view of the present disclosure, a PHOSITA, in hindsight, will be able to identify various means of forming the apertures. In a preferred embodiment, the apertures are formed by a drilling technique. Suitable drilling techniques include laser etching and mechanical perforation techniques including injection molding and mechanical or manual drilling. For example, it is contemplated within the scope of the present invention that an injection mold is used to form the substrate layer and that the apertures are simultaneously formed in the substrate layer by elements of the injection mold that perforate portions of the substrate layer. In one embodiment, the method is a laser etching method whereby a laser is applied to the substrate layer to form the apertures. Various lasers will be apparent to a PHOSITA. Preferably a carbon dioxide ($CO_2$) laser is employed for drilling the apertures. In a preferred embodiment, the apertures are conical in shape having a wider opening proximal to the laser source and a narrower opening distal from the laser source. As such it is preferred that the apertures are laser-formed from the back side (water surface) toward the front side (fiber surface). It has surprisingly been found that having narrowed aperture openings on the fiber surface minimizes clogging of the apertures.

One embodiment of the watermark sheet described throughout herein comprises, among other elements, a set of apertures. The set of apertures extend from the water surface toward the fiber surface. In some embodiments, the apertures do not extend through the full thickness of the substrate layer. In some embodiments, the watermark areas include, along with the relief structure, a set of apertures that extend from the water surface toward the fiber surface and preferably through the full thickness of the watermark area. These apertures control the drainage rate of the liquid from the slurry of fibers and in the watermark areas this is further controlled by the relief structure since the size of the apertures can be modified across the relief structure. For example, in one embodiment, the size of the apertures in the substrate layer is tapered. Accordingly, the drainage rate across the relief structure can be increased or decreased across the slurry in the watermark areas, since the aperture openings in the watermark areas will necessarily vary. Alternatively, the apertures may be held constant from water surface to fiber surface such that the drainage rate is less impacted by the relief structure.

In one embodiment, the apertures are formed by drilling from the water surface toward the fiber surface in a manner such that the apertures taper (i.e., narrow) as they approach the fiber surface. It has been found that with the size of the malleable material used in the present invention, drilling from the water surface, especially by laser drilling, facilitates improved control of the tapering effect across the watermark areas thereby allowing for aperture size uniformity over the full pattern of multiple watermark indicia. Accordingly the set of apertures and drainage in each watermark area can be substantially identical or varied as desired.

In one embodiment, the apertures are formed by drilling from the fiber surface. For example, by laser drilling which tapers the apertures toward the water surface or by mechanical drilling which maintains the width of the apertures as they extend from the fiber surface towards the water surface.

In one embodiment, the watermark sheet comprises an electrotype area, among other elements. Electrotypes as used herein refers to an element in a watermark sheet that imparts a two-tone or light watermark effect. In certain embodiments, the electrotype of the present invention forms an integral part of the substrate layer. It is not attached in a separate process but is instead formed through an ablation process similar to or even simultaneously with the ablation process used to form the relief structure of the watermark indicia. Here, the electrotype areas have reduced drainage either due to the absence of aperture openings on the fiber surface or the reduction of the number of apertures or the reduction in the size of the openings relative to other portions of the substrate layer. With reduced drainage, and because the electrotype areas are raised above their immediate surrounding areas, very light areas are formed in the paper. The electrotype areas may be formed in the sunken places, the raised places, the plane places or any combination thereof, of the watermark indicia. It is also contemplated that the electrotype areas form holes in the paper if sufficiently raised.

In an alternative embodiment the light element can be an add-on similar to attached electrotypes. However, here the electrotype is added by dropping a molten form of the substrate layer material onto the substrate layer to increase the thickness of the substrate layer in a controlled area, curing the add-on material, and then ablating the cured add-on material to form the light element that is raised above the background area of the watermark sheet. It is also contemplated that the add-on process can be by gluing or otherwise growing the light element onto the substrate layer. 3-D printing and chemical vapor deposition are other add-on techniques contemplated within the scope of the present invention.

In one embodiment, the electrotype area is formed in a raised place on the watermark indicia and thereby forms a very light area interposed over the watermark area in the paper. The inventors have found that by integrating the electrotype area with the substrate layer, it is possible to form complex letters, symbols and numerical indicia as an electrotype. Accordingly, in one embodiment the electrotype area forms a symbol a complex indicia such as Arabic, Korean, Chinese or Japanese text.

It is also contemplated that the electrotype areas is integrated into a sunken place thereby providing high contrast of dark and light areas that are juxtaposed in immediate side-by-side locations. In one embodiment, a hole is formed surrounded by very dark areas in the watermark area. In another embodiment, the electrotype area is interposed with at least one of the watermark areas such that it is either in the sunken place, the raised place or both. As used herein, the sunken places are understood as the portions of the relief structure below the background plane, while the raised places are understood as the portions of the relief structure above the background plane. The background plane refers to portions of the substrate layer having no watermark areas.

In one embodiment, the watermark areas are formed by an ablation process which forms the relief structure depicting the indicia. Various ablation techniques will be apparent to a PHOSITA in view of the present disclosure. However, in a preferred embodiment, the ablation process employs a laser which is applied to the substrate at an ablation angle relative to the substrate surface; preferably the ablation angle is not perpendicular to normal. The ablation process may precede, follow or be simultaneous with the perforation process. However, in a preferred embodiment where burring is to be avoided, it has been found that ablation following perforation provides less burring in the relief structure as the ablation process will generally reduce the buffing effect caused by drilling the apertures. Nonetheless, it is also contemplated within the scope of the present invention that the apertures are formed after the relief structure has been formed; this is especially suitable when drilling is from the fiber surface towards the water surface. Another surprising benefit of perforating before ablating is that in the watermark areas the perforations can be stopped short of the full thickness of the substrate layer so that subsequent ablation will reveal the apertures from the fiber surface. This reduces the amount of energy required to form the apertures and also reduces the burring defect.

In another aspect, the invention comprises a method of forming the watermark sheet. In one such embodiment, the method of forming the watermark sheet comprises (a) providing a substrate layer as described herein where the substrate layer includes a water surface and an opposed fiber surface; (b) perforating the substrate layer to form a set of apertures extending from the water surface towards the fiber surface—and preferably through the full thickness of the substrate layer; and (c) forming watermark areas on the fiber surface by ablating areas of the fiber surface to form a pattern of multiple indicia over a continuous area of the fiber surface.

As described herein, various sequences are contemplated within the scope of the present invention for forming the apertures and forming the watermark areas. Whether the perforation and the ablation steps are simultaneous, or occur one before the other, such sequence is within the scope of the present invention. In one embodiment, particularly where burring is to be avoided, it is preferred that the substrate layer is perforated from the water surface and that the perforation step precedes the ablation step.

Various methods are contemplated for forming the substrate layer including, but not limited to, injection molding, 3D printing and vacuum deposition.

In one embodiment, the method of forming the watermark sheet comprises, among the other elements, forming watermark indicia by ablating the watermark areas to form relief structures with sunken places, plane places and/or raised places. As noted herein, the watermark areas may also be ablated to form light elements or other malleable materials may be added onto the substrate layer and ablated to form the light elements. Various methods of ablation will be apparent, to a PHOSITA in view of the present disclosure. Preferred methods of ablation include laser drilling with a $CO_2$ laser.

In preferred embodiments, the watermark indicia are distributed across the fiber surface as a pattern of multiple watermark indicia. While it is contemplated that at least two of the watermark indicia are distributed over a continuous area of the fiber surface, it is preferred that that a full pattern of watermark indicia is distributed over a single continuous area of the fiber surface. Along with the watermark areas, the substrate layer is also modified to include perforations and preferably the apertures are distributed in a pattern or to form an indicia, either of which may be used as a level 1 or level 2 security feature for high security documents. In a particular embodiment, at least portions of the background indicia or pattern is imperceptible by the naked human eye but is evident with the help of an optical aide such as a microscope or other magnifying or tactile device.

In one embodiment, the apertures are perforated in a pattern such that there is a differential distribution of apertures in the background area. For example, the frequency of the apertures or sets of apertures are adjusted along one or more axes. Alternatively, or in combination, the apertures are formed such that the diameters of the apertures or sets of apertures vary along one or more axes, such that the drainage rate is accordingly varied. Similarly, in one embodiment, an indicia is formed in the paper, by varying the frequency, and/or size of the apertures such that sunken places and raised places cooperate to form HFD areas and LFD areas that in turn cooperate to depict watermark indicia in the paper.

In another aspect, the present invention comprises a watermark sleeve apparatus. In one embodiment, the watermark sleeve comprises (a) a cylinder mold having an outer diametric surface; and (b) the watermark sheet as described herein; especially as set forth in claim 1. The watermark sheet is wrapped around and affixed to the outer circumference surface of the cylinder mold.

In one embodiment, the watermark sleeve as set forth herein, comprises, among other elements, a cylinder mold as defined herein. As used herein, a cylinder mold includes, for example, a forming wire, a dandy roll, a cylinder roll, a short form, a top form or any component of a paper machine or that can be applied to a paper machine such that when a watermark sheet is attached thereto it can be brought in contact with a slurry of fibers to impart a watermark indicia to paper being formed on the paper machine.

In one embodiment, the watermark sleeve as set forth herein, comprises, among other elements, a watermark sheet as described herein. In one particular embodiment, the watermark sheet is attached to the cylinder mold such that the watermark sheet is exposed to the slurry of fibers during paper manufacture. In view of the present disclosure, various methods of attachment will become apparent to a PHOSITA. All such methods are contemplated within the scope of the present invention. In preferred embodiments, the watermark sheet is glued or fastened to the cylinder mold.

In one embodiment, the watermark sleeve as set forth herein, comprises a pattern of apertures suitable for forming watermark islands. Here, the term islands refers to an area in a watermark that is surrounded by a uniform background that has a different tonality. For example, in one embodiment, the background area comprises apertures arranged in a pattern of about 50 to about 90 holes/cm. A first island area having apertures arranged in a pattern of between 90 and 100 holes/cm is disposed within the background area. A second island area having apertures arranged in a pattern of between 150 to about 250 holes/cm is disposed within the first island area. Similar island patterns are also contemplated where the background has apertures arranged in a pattern of between 150 to about 250 holes/cm and a first island area of 90 to about 100 holes/cm and a second island area of apertures arranged in a pattern of about 50 to about 90 holes/cm. In a particular embodiment, the background comprises apertures arranged in a pattern of about 65 holes/cm a first island of about 100 holes/cm and a second island of about 195 holes/cm. Surprisingly, it has been found most suitable for the aperture openings on the fiber surface to be smaller than the aperture openings on the water surface.

The watermark sheet is affixed to the surface of the cylinder mold that is exposed to the slurry of fibers. This surface is generally referred to herein as the diametric surface. For example, where the cylinder mold is a forming wire, the diametric surface is the top surface on which the slurry of fibers is carried, while in a vat or Fourdrinier operation, the diametric surface can be for example the cylinder roll's surface closest to the slurry of fibers. Through the present invention it has been surprisingly found that, unlike wire mesh, the malleable material employed in the present invention does not require a separate support layer or support portions. Nonetheless, it is also contemplated herein that the watermark sheet is affixed to the cylinder mold either directly or indirectly. For example additional components may be added to the water surface of the substrate layer to modulate drainage rates.

An additional aspect of the present invention comprises a method of forming the watermark sleeve. In one embodiment, this method comprises (a) forming a watermark sheet as described herein; (b) providing a cylinder mold; and (c) affixing the watermark sheet over the outside or exposed diametric surface of the cylinder mold.

Another aspect of the present invention comprises a watermark paper. In one embodiment, the watermark paper comprises (a) paper substrate having watermark areas and background areas; (b) a watermark indicia integrated with the paper substrate over the watermark areas; and (c) a background indicia or background pattern integrated with the paper substrate over the background areas.

Various paper substrates will be apparent to a PHOSITA in view of the present disclosure. However, in preferred embodiments, the paper substrate is formed of cellulose or a blend of cellulose and other materials such as, for example, polymeric materials. It is contemplated that the paper substrate is a single-layer or multi-layer construct.

As described herein, the watermark indicia are disposed in the watermark areas of the paper substrate as relief structures with high fiber density (HFD), low fiber density (LFD) and nominal fiber density (NFD). The HFD, LFD and NFD cooperate to form indicia in the paper.

In one embodiment, the background indicia or pattern is formed through the differential distribution of the apertures in the background area. As such the aperture frequency, aperture size or combinations thereof are organized such that HFD areas and LFD areas cooperate to form the background indicia or pattern.

Another aspect of the invention comprises a method of forming the watermark paper. In one embodiment, the method of forming a watermark paper comprises (a) providing a paper machine with a watermark sleeve as described herein; (b) directing a slurry of fibers across the fiber surface of the watermark sheet such that at least one of a watermark indicia, or background indicia or pattern is embossed into the forming or resulting paper. Various paper machines will be apparent to a PHOSITA and are contemplated in the present invention. In a preferred embodiment the paper machine is selected from a vat or Fourdrinier. In a vat machine the cylinder mold is a cylinder roll and according to the present invention is affixed with a watermark sheet to form a watermark sleeve. It is then directed into a vat filled with a slurry of fibers. As the watermark sleeve turns, fibers collect on the sleeve at various fiber densities corresponding to the depth of the relief structures and any present apertures in the watermark areas and corresponding to the differential distribution of the apertures in the background areas. In certain embodiments, the background indicia or patterns formed are interposed with the watermark indicia.

In certain embodiments, the paper includes light areas or holes formed by the light element (e.g., electrotype), which themselves may be interposed with the background areas, the watermark areas or both. For example in one embodiment, the indicia is a composite indicia whereby the portions of the indicia are formed by the watermark indicia while other parts are formed by the background pattern or indicia.

Another aspect of the invention comprises a high security document. In one embodiment, the high security document comprises (a) a watermark paper as described herein; and (b) a surface treatment.

Various high security documents are contemplated within the scope of the present invention and will be apparent to a PHOSITA in view of the present invention. In a preferred embodiment, the high security document is a banknote or other currency or government issued documents.

Various surface treatments are also contemplated within the scope of this invention and will be apparent to a PHOSITA in view of the present invention. For example, anti-soiling treatments, design treatments or security device treatments are suitable surface treatments. In one embodiment, an anti-soiling treatment is applied to the surface of the paper and/or to the paper's bulk through impregnation. Alternatively, or in addition, in another embodiment, a design treatment is applied to the paper such as printing of text by intaglio or other high security print such as microtext printing. Another alternative or additional surface treatment is a security device such as holograms, threads (e.g., windowed, fully exposed or fully embedded) with machine readable features (e.g., magnetics, IR, etc.). It is also contemplated herein that a micro-optic security thread could be added to the paper. A surface treatment, as used herein, therefore includes any treatment to the paper's surface and/or bulk.

In one embodiment, the surface treatment is a thread interposed with the watermark indicia or the background indicia such that the visual characteristics of the thread and/or the watermark indicia or the background indicia or pattern are enhanced or form a composite indicia or pattern.

In another aspect of the present invention a method of forming the high security document is provided. In one embodiment, this method comprises (a) providing a watermark paper, as described herein; and (b) applying a surface treatment to the watermark paper.

The invention will be further described by reference to certain specific embodiments depicted in the drawings.

EXAMPLES

In a first example, a watermark sheet 100 is depicted in FIG. 1. In this embodiment, the watermark sheet 100 comprises a watermark area 102' having a watermark indicia 102 in the form of a relief structure. The watermark sheet also comprises a background pattern formed from a shaped indicia 103 in the form of a set of letters (i.e., "P"). The watermark indicia 102 is surrounded by the background area 101 of the continuous sheet 100 and enhances the visual distinction of the watermark indicia 102.

Figure 2:
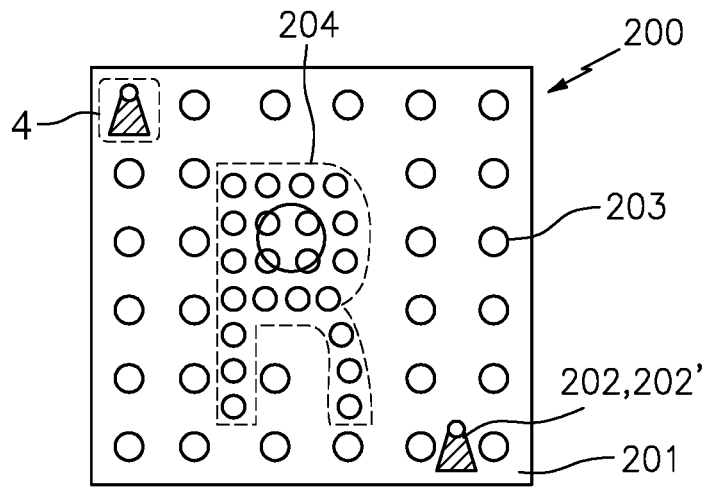
FIG. 2 shows a top-down view of a watermark sheet with watermark indicia surrounded by a background pattern of apertures organized in a differential distribution to project a background indicia.

In another example, a watermark sheet 200 is depicted in FIG. 2. In this embodiment, the watermark sheet 200 comprises a watermark area 202' having a watermark indicia 202 in the form of a relief structure. The watermark sheet 200 also comprises a background pattern formed in the background area 201. The background pattern is formed by the differential distribution of apertures 203. Here the background apertures 203 are imperceptible to the naked human eye but can be readily identified by an optical aid such as a microscope or magnifying glass. In one area the apertures 203 are organized to provide indicia 204 in the form of a letter "R". This letter "R" 204 is observable with the naked human eye in transmitted light. However, in reflected light it is also imperceptible with the naked human eye.

Figure 3:
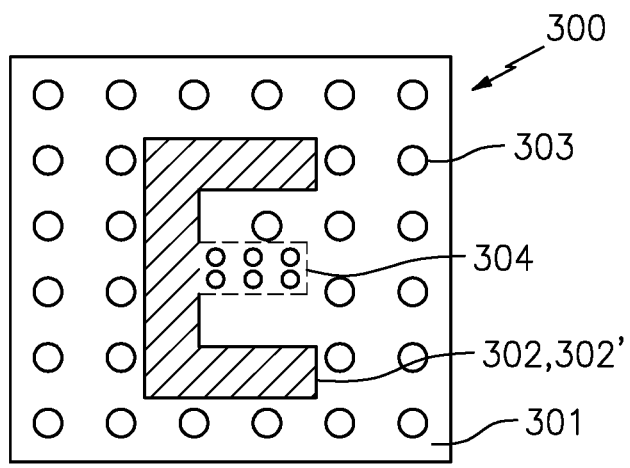
FIG. 3 shows a top-down view of a watermark sheet with composite indicia formed from background pattern in combination with watermark indicia.

In another example, a watermark sheet 300 is depicted in FIG. 3. In this embodiment, watermark indicia 302 is a composite watermark indicia formed partly from a watermark indicia 302 in the watermark area 302' and by a background pattern 304 formed by a differential distribution of apertures 303 in the background area. Together these segments cooperate to display the letter "E" surrounded by the apertures 303 in the background area 301.

Figure 4:
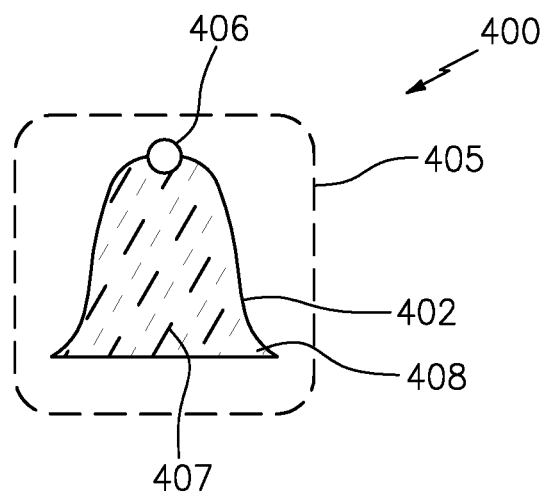
FIG. 4 shows a top-down view of a relief structure in a watermark area on a watermark sheet where the watermark indicia includes a light element.

In another example, a watermark sheet 400 is depicted in FIG. 4 with a watermark area 405 which includes a watermark indicia in the form of a relief structure with sunken places 407 and raised places 408 which cooperate to project a negative watermark image (NWI) or indicia 402 in the sheet 400. This watermark indicia 402 also includes a light element 406 at the top of the bell which will reduce fiber density in this area. This light element prevents or reduces the drainage rate thereby reducing the fiber density such that a hole or a very light area is formed in the corresponding paper.

Figure 5:
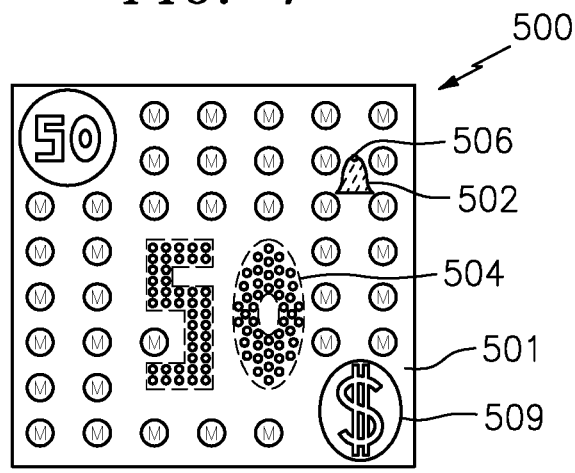
FIG. 5 shows a top-down view of a high security document having a watermark sheet with watermark indicia, background pattern and surface treatment.

In another example, depicted in FIG. 5, is a high security document 500; here a banknote. Here the banknote 500 comprises a watermark sheet with a watermark indicia 502 with light element 506 and a pattern of apertures 504 organized to depict a level 2 micro-text 504 in background area 501 that is used to identify the banknote 500. There is a surface treatment 509 applied to the watermark sheet in the form of a printed feature.

Figure 6:
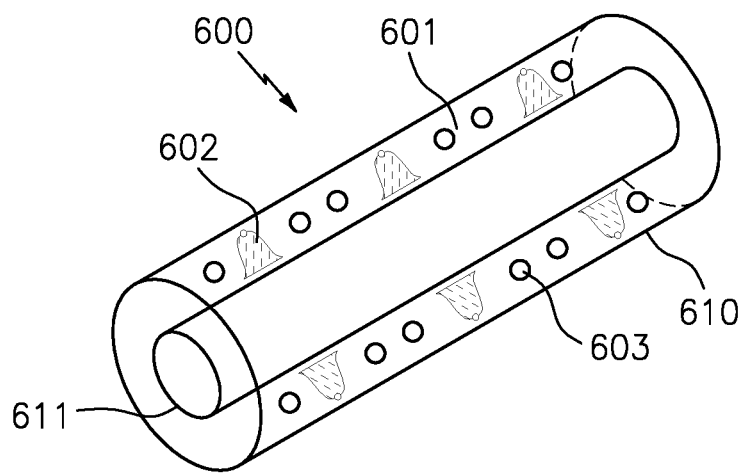
FIG. 6 shows a view of a watermark sleeve with a watermark sheet on a cylinder roll cylinder mold.

In another example, depicted in FIG. 6, a watermark sleeve 600 is provided. The watermark sleeve 600 comprises a cylinder mold in the form of a vat machine's cylinder roll 611. A watermark sheet 610 is wrapped around the diametric surface and attached thereto by fastening and/or gluing. On the outer diameter of the sleeve are watermark indicia 602 and a background pattern of bells 601. Apertures 603 extending from the water surface are exposed in the fiber surface (i.e., the outer diametric area of the apparatus). During paper manufacture the watermark sleeve 600 is brought into contact with a slurry of fibers for making paper. The image of the watermark indicia 602 and the background pattern 601 are impressed into the paper fibers leaving a relief structure in the watermark area of the paper corresponding to the watermark indicia in the watermark sheet 610.

Figure 7:
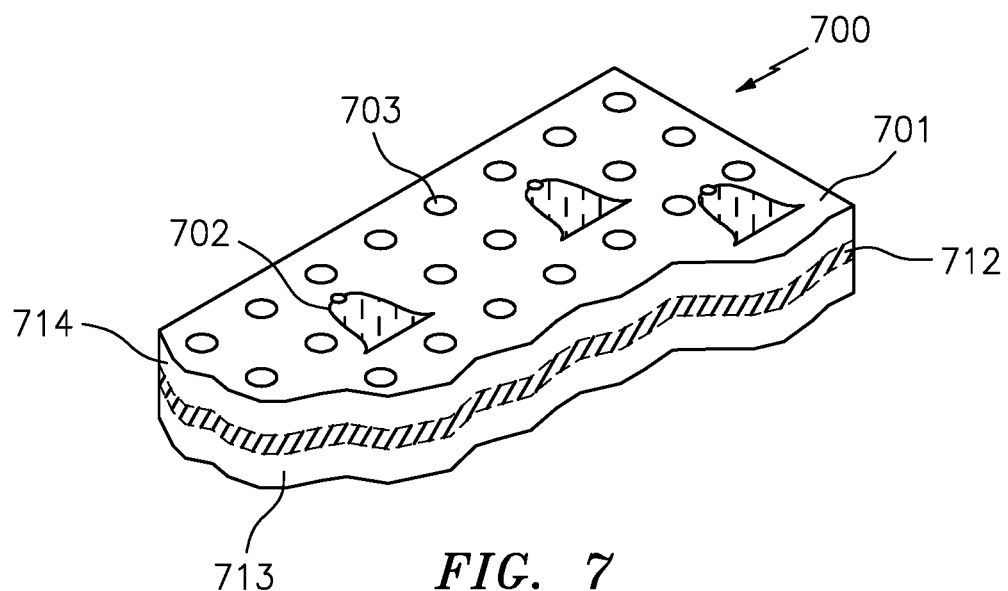
FIG. 7 shows a cross-sectional view of a watermark sheet having a multilayer construction.

In another example, depicted in FIG. 7, a watermark sheet 700 is provided with a multi-layered construction, wherein 2 malleable layers 712, 714 sandwich a less malleable layer 713 such as a metal intermediate layer. The watermark sheet, as shown here depicts that watermark indicia 702, and the apertures 703 in the background area 701.

Figure 8:
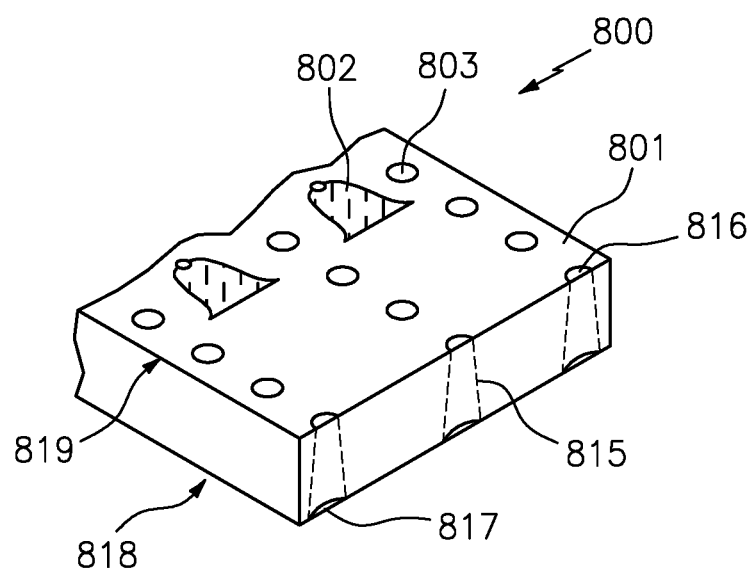
FIG. 8 shows a cross-sectional view of a watermark sheet with tapered apertures.

In another embodiment, depicted in FIG. 8, a cross-sectional view of a watermark sheet 800 is provided showing watermark indicia 802 and apertures 803 in the background area 801, and tapered apertures 815 as they taper from the top side 819 (i.e., the fiber surface 816) toward the bottom side 818 (i.e., the water surface 817). Here drilling of the apertures can be by various procedures including laser drilling.

While various embodiments of the present invention have been described above it should be understood that they have been presented by way of example only, and not limitation. Thus, the breadth and scope of the present invention should not be limited by any of the exemplary embodiments.

The invention claimed is:

1. A watermark sheet comprising:
   a malleable substrate layer including (i) a water surface and (ii) a fiber surface opposite the water surface;
   a pattern of at least two watermark indicia; and
   a set of apertures extending from the water surface toward the fiber surface,
   wherein the pattern of at least two watermark indicia is distributed over a continuous area of the fiber surface.

2. The watermark sheet of claim 1, wherein the fiber surface comprises a continuous layer comprising at least one of a plastic, elastic, thermoplastic or thermoset material.

3. The watermark sheet of claim 1, wherein the watermark sheet has a width that ranges from about 50 millimeters to about 5 meters.

4. The watermark sheet of claim 1 wherein the malleable substrate layer includes watermark areas and background areas where the watermark indicia are set in the watermark areas surrounded by the background areas.

5. The watermark sheet of claim 4, comprising apertures in the background areas extending through a full thickness of the background areas.

6. The watermark sheet of claim 4, wherein the watermark indicia comprise a relief structure having sunken places and raised places.

7. The watermark sheet of claim 6, wherein the watermark areas includes apertures extending through a full thickness of the watermark areas.

8. The watermark sheet of claim 4, wherein the fiber surface includes electrotype areas integrated with at least one of the watermark areas and the background areas.

9. The watermark sheet of claim 1, wherein at least some apertures of the set of apertures are formed by drilling from the water surface toward the fiber surface.

10. The watermark sheet of claim 1, wherein at least one aperture of the set of apertures tapers from the water surface towards the fiber surface.

11. The watermark sheet of claim 4, wherein the pattern of at least two watermark indicia is formed by ablating the watermark areas.

12. The watermark sheet of claim 4, wherein the background areas include background indicia formed through differential distribution of apertures of the set of apertures in the background areas.

13. The watermark sheet of claim 8, wherein an electrotype area is interposed with at least one of the watermark areas such that it is in one or more of: a sunken place or a raised place.

14. The watermark sheet of claim 13, wherein the electrotype area is formed by ablation.

15. The watermark sheet of claim 1, wherein the watermark sheet is suitable for wrapping around and affixing to between about 80% and about 100% of an outer diametric surface of a cylinder mold.

16. A watermark sleeve comprising:
a cylinder mold having an outer diametric surface; and
the watermark sheet of claim 1,
wherein the watermark sheet is wrapped around and affixed to the outer diametric surface of the cylinder mold.

* * * * *